July 26, 1938.  C. E. P. GOURDOU  2,125,225
SIGHTING GEAR
Filed April 2, 1936   3 Sheets-Sheet 1

C. E. P. Gourdou
INVENTOR

By: Glascock Downing Seebold ATTYS.

July 26, 1938.  C. E. P. GOURDOU  2,125,225
SIGHTING GEAR
Filed April 2, 1936  3 Sheets-Sheet 2

C. E. P. Gourdou
INVENTOR

By: Glascock Downing & Seebold
Attys.

July 26, 1938.  C. E. P. GOURDOU  2,125,225
SIGHTING GEAR
Filed April 2, 1936  3 Sheets-Sheet 3
FIG. 5
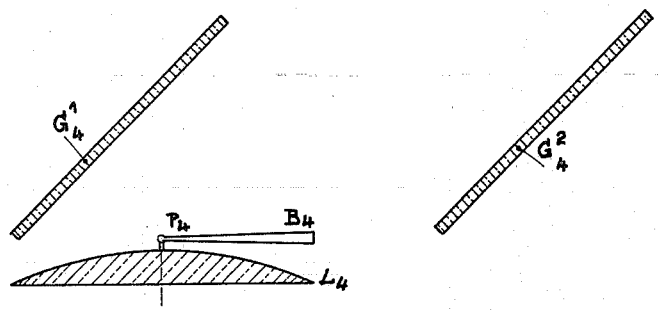
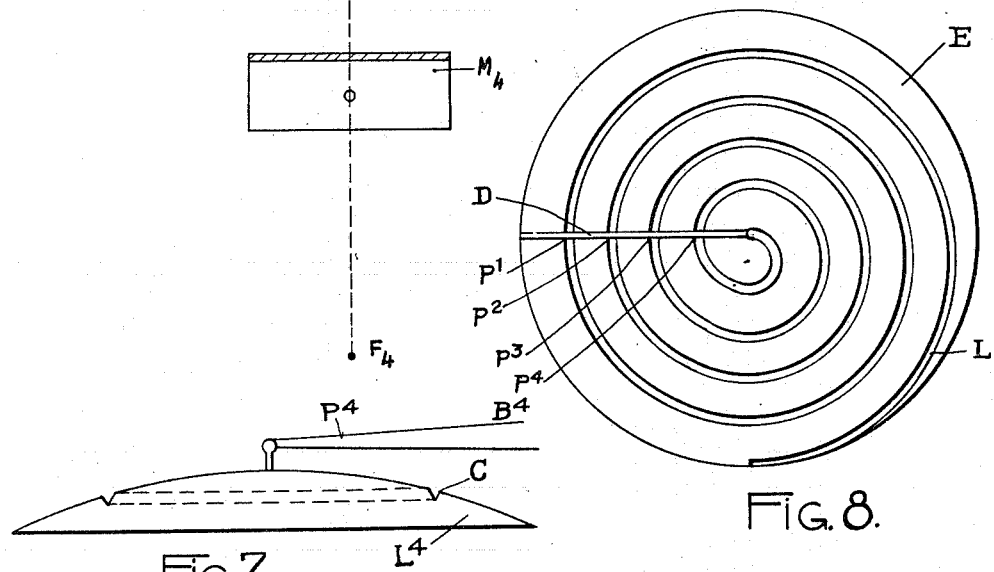
FIG. 7.  FIG. 8.
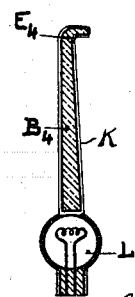
FIG. 6.
C. E. P. Gourdou
INVENTOR
By: Glascock Downing & Seebold
Attys.

Patented July 26, 1938

2,125,225

UNITED STATES PATENT OFFICE 2,125,225

SIGHTING GEAR

Charles Edouard Pierre Gourdou, Le Parc St.-Maur, France, assignor to Société Anonyme de Constructions Aeronautiques (S. A. G. A.), Geneva, Switzerland Application April 2, 1936, Serial No. 72,433
In France April 5, 1935

10 Claims. (Cl. 88—1)

This invention relates to a sighting device adapted for vertical dive aerial bombardment and for the measurement of the speed of an airplane equipped with the said device.

Bomb sights are already known in which use is made for stabilizing a line of sight, either of a gyroscopic system, or a level or a pendular device.

The present invention relates to an improved sight of the gyroscopic type which gives great accuracy and does not require any special regulating means. Moreover, the pilot is not compelled to apply an eye against a sight-eyepiece; he has the possibility of aiming with both eyes and without the latter occupying a definite position.

The device according to the present invention consists in the combination of: a gyroscope having vertical axis, a mirror rigid with the rotor box of the said gyroscope, a source of light rigid with the airplane, an optical system also rigid with the airplane, interposed between the source of light and the mirror and arranged in such a manner that rays of light emitted by the said source pass through the system for reaching the said mirror, a first oblique transparent glass plate rigid with the airplane and receiving the rays reflected by the said mirror after they have passed in return through the said optical system and at least a second transparent glass plate rigid with the airplane and arranged parallel to the first glass plate for receiving the rays reflected by the first said glass plate, the said second glass plate reflecting in its tour the said rays parallel to the direction in which they reach the first glass plate, the said second glass plate being placed relatively to the optical system and to the gyroscope so that the pilot can see without any obstacle and independently of his position relatively to the said second glass plate, through the said second glass plate on the one hand the scenery and on the other hand to infinity the image of the source of light which coincides with the target when the path followed by the airplane coincides with a definite direction such as the vertical passing through the target.

The invention further relates to other particular features which will appear from the following description with reference to the accompanying drawings, given by way of example only, in which:

Fig. 5 is a general elevation, in longitudinal axial section, of another constructional modification of a sighting gear utilizing the action of a gyroscope.

Fig. 6 is a sectional elevation of a device allowing the formation of a luminous spot in the system illustrated in the preceding figure.

Fig. 7 is an elevation in section of a device permitting a circle of light to appear on the ground.

Fig. 8 is a plan view of a device permitting luminous spots to appear on the ground.

An embodiment given by way of example, is that of a sight based on the properties of the gyroscope.

Figure 1:
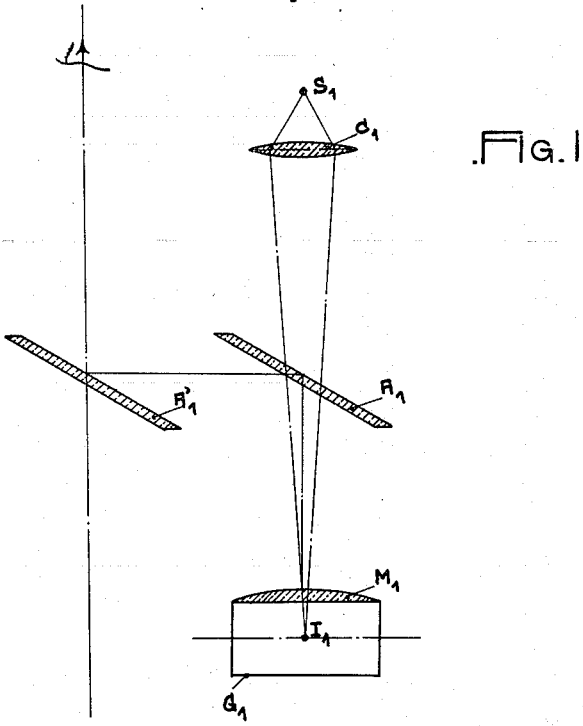
Fig. 1 is a general elevation, in longitudinal axial section, of a form of construction of a sighting device made according to the invention and utilizing the action of a gyroscope.
Figure 2:
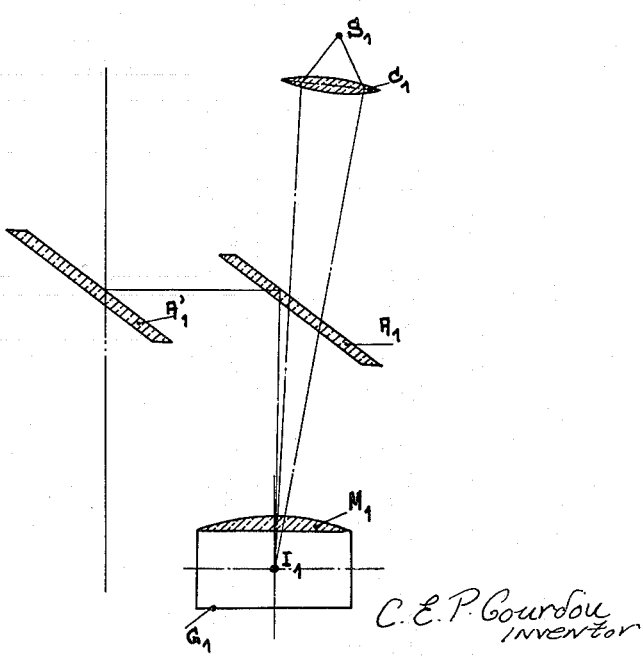
Fig. 2 is a corresponding view of the sighting gear when the airplane, provided with the same, is subjected to the action of a strong transverse wind.

The sight is essentially composed of a gyroscope carrying on its upper face a mirror flat or of suitable curvature, and of a suitable optical system allowing to send back light rays parallel to the axis of the gyroscope whatever may be the position of the airplane. Figs. 1-2 illustrate by way of example, a form of construction of this type of sight:

1.—A gyroscope $G_1$, rotating about a point coinciding with its center of inertia $I_1$ or very adjacent thereto, about which it is universally hung by a suitable device. On this gyroscope is secured a mirror $M_1$, having suitable curvature and the focus of which is at the center of inertia of the gyroscope $G_1$.

2.—An optical system composed of a source of light $S_1$, of a lens $C_1$, adapted to cause the rays to converge on the focus of the mirror $M_1$, and of two parallel reflecting systems, either transparent glass plates or semi-silvered prisms.

The optical system is rigid with the airplane and follows all its inclinations, whilst the gyroscope always remains horizontal.

Assuming the airplane dives down without wind, the point $S_1$ is on the vertical of the center $I_1$ of the gyroscope, the light rays issued from $S_1$ pass through the lens $C_1$ and converge to the focus of the mirror $M_1$, but they are reflected by this mirror according to the axis of rotation of the gyroscope. These rays then strike against the reflecting system A₁ which sends them back onto the second system A₁' from which the rays are reflected in a direction parallel to that of the rays sent back by the mirror M₁, that is to say in a direction perpendicular to the horizontal. The image of a luminous spot placed at S₁ will be formed on this vertical and to infinity since the light rays issued from S₁ converge to the focus of mirror M₁.

Assuming now that the airplane dives down with a transverse wind, Fig. 2, the axis of the airplane will then form a certain angle with the vertical, it will therefore have a certain incidence. The gyroscope remains horizontal, but the optical system rigid with the airplane moves with it. The light rays issued from S₁ still converge to the focus of mirror M₁ since the latter is at the center of inertia of the gyroscope, that is, the point where the axes of the Cardan suspension meet. The light rays are therefore always reflected perpendicularly to the horizontal, they strike against the first reflecting system A₁ which sends them back onto A₁', from which they are reflected parallel to the rays issued from M₁.

Therefore, whatever may be the position of the airplane, the light rays will always be reflected according to a vertical. For the pilot's eye, this line can be materialized by a luminous spot which reflected to infinity, will serve as line of sight.

Figure 3:
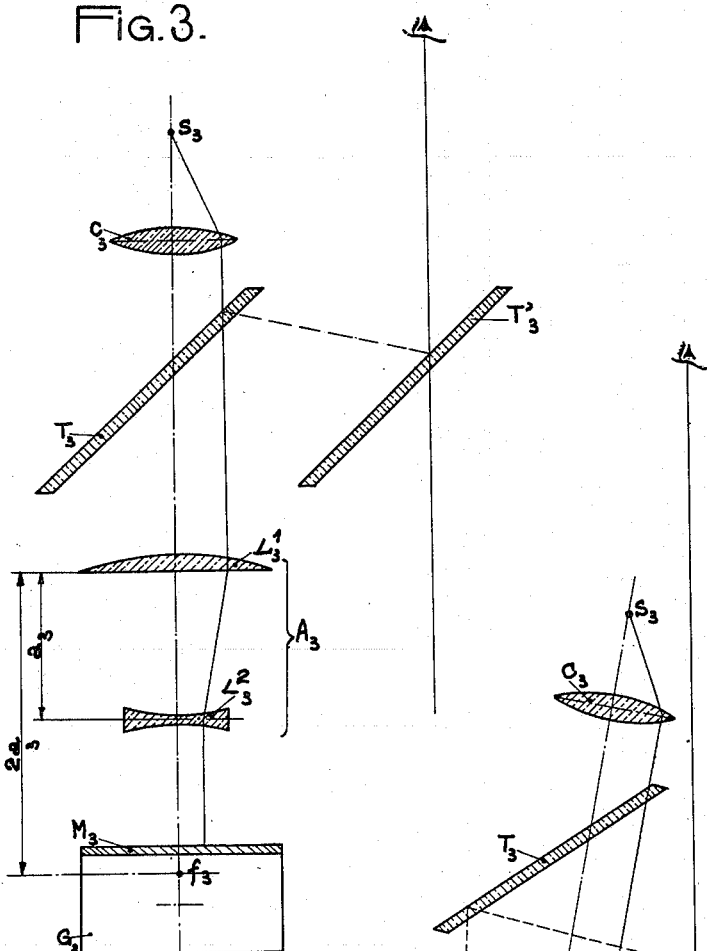
Fig. 3 is a general elevation, in longitudinal axial section, of another constructional modification of a sighting gear utilizing the action of a gyroscope.
Figure 4:
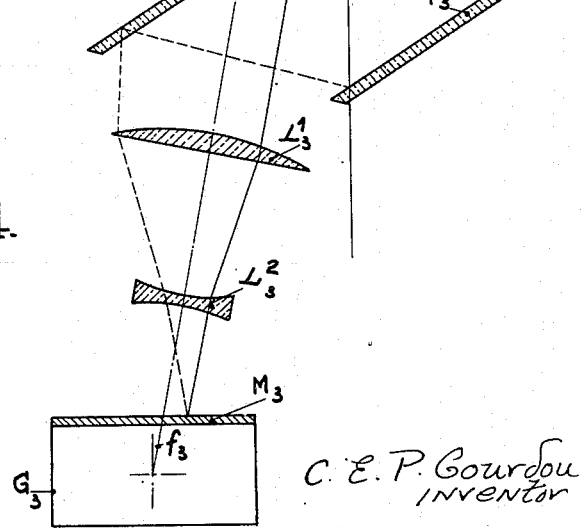
Fig. 4 is a corresponding view, the airplane being subjected to the action of a strong transverse wind.

Another embodiment of a device utilizing a gyroscope is described hereinafter with reference to Figs. 3 and 4.

The mechanism is composed of a source of light S₃ (point or cross), placed at the focus of a lens C₃. The rays issued from S₃, issue from C₃ parallel to the axis of the system. They pass through a system of lenses A₃, described later on, and issue therefrom, their beam remaining parallel. They then strike against a plane mirror M₃, at right angles to the axis of a gyroscope G₃. They are reflected by this mirror, return through the optical system A₃ and, by passing through a set of parallel unsilvered glass plates T₂, T₃', they reach the observer's eye.

When the mirror M₃ of the gyroscope is at right angles to the luminous axis S₃, C₃ (Fig. 3), the ray which issues from the last unsilvered glass plate is parallel to this direction. If the mirror M₃ remaining horizontal (property of the gyroscope), the optical system assumes a certain inclination relatively to this mirror (Fig. 4), the rays issued from S₃ parallel to the system of lenses A₃ are reflected by the mirror M₃, by forming, with the axis of the optical system, an angle which is double the incidence angle. In order that the ray which passes again in the system of lenses A₃ should issue therefrom parallel to the perpendicular to the mirror, it suffices that this system A₃ divides by two the angles formed with the axis by the rays passing through the system.

*Descripion of the optical system A₃.*—The optical system A₃ is substantially composed of an assemblage of lenses the focii F₃ of which coincide. A light ray entering the first lens parallel to the axis, issues from the optical system parallel to the axis, whatever may be the number of lenses, provided this number is an even number, and that it is suitably coupled. It suffices, in order that the condition of the divisions of the angles should be satisfied, that the system should have a magnification of 2 or ½, according to the direction in which it is considered. In particular, a very simple embodiment consists in utilizing as first lens, a convergent lens L₃¹, having a focal distance 2a₃; at a distance a₃ from the center of this lens, will be arranged a divergent lens L₃², having a focal distance a₃. In these conditions, the rays entering L₃¹ parallel to the axis, issue from L₃² parallel to the axis. They are reflected by the mirror M₃, return through L₃², then L₃¹. The inclination of the reflected ray relatively to the axis, at the entrance of L₃² is divided by two when issuing from L₃¹; this ray issues therefore parallel to the normal to the mirror, as in the device previously described, and this ray reaches the observer's eye.

It is possible, no longer to have a reflected ray rigorously vertical, but to take into account, to a certain extent, the inclination of the airplane relatively to the vertical of the target. In order that the airplane should dive down according to the vertical of the target, when wind is blowing, it is necessary that its longitudinal axis should have a certain inclination in the space relatively to the vertical. This inclination is function of the characteristics of the airplane or of its wing surfaces, of the speed of the wind and of the speed of the airplane, which latter speed is substantially uniform after a certain time of fall, therefore, finally, only function of the characteristics of the airplane or of the wing surfaces and of the speed of the wind.

The projectile released by the airplane, is subjected to the action of the wind, and consequently, if it is released rigorously on the vertical, it is subjected to a deviation moreover slight which can be taken into account if the optical system A₃ indicates a direction as near as possible to the direction which will be followed by the bomb, the wind being taken into consideration. It suffices for obtaining this result that the magnification of the optical system used should be slightly greater or slightly smaller than 2 or ½ according to the direction in which it is considered.

Another form of construction of a gyroscopic apparatus is more particularly illustrated in Figs. 5 and 6.

A luminous spot P₄ is laid on a lens L₄ having a focal distance of 300 millimeters for instance. The mirror of the gyroscope M₄ is placed at 150 millimeters, that is to say at half the focal distance of point P₄. In these conditions, the image of spot P₄ occurs at F₄ symmetrical to P₄ relatively to M₄; F₄ is the focus of the lens L₄. It is easy to see, in these conditions, that if the mirror M₄ inclines according to any angle, the ray issued from spot F₄, image of P₄, always issues from the lens L₄ in a beam perpendicular to M₄.

This device, more simply, avoids any kind of aberration and allows of obtaining a larger field.

Above P₄ are arranged the two unsilvered glass plates G₄¹, G₄² which completes the apparatus.

*Production of the luminous spot.*—For producing the luminous spot P₄, use is made of the well known property of a glass stick B₄, for transporting the light from one point to another. Assuming (Fig. 8) a small stick of substantially cylindrical shape and the end of which E₄ is bent at right angles and is at the same time tapered, if a small incandescent lamp L₄ is placed under this stick, it will be found that the end E₄ appears as an extremely bright spot. It suffices to surround the stick with a black thread, for instance, so that it does not itself directly appear and that alone the spot E₄ is really luminous. A nearly punctiform and extremely bright source of light is thus obtained.

It is necessary to surround the stick with a body such as a thread, which does not stick to the glass, otherwise the light rays in the stick would not be reflected along its walls and would be lost in the space. A varnish, for instance gives very bad results. Generally speaking, it is necessary to surround the stick with an opaque body such as a metal tube K leaving between the body and the stick an annular space for air.

The stick in question is horizontally laid on the lens. It is sufficiently small in order that the field of sight should not be affected thereby.

Fig. 7 shows the lens $L_4$ of Figure 5 but this lens has a luminous groove C in which is caused to appear either by a wire rendered incandescent, or in any other manner, a luminous circle which appears on the ground for the pilot and which allows of controlling the filing off time of an obstacle of the ground in said luminous circle.

Fig. 8 shows a device for causing a plurality of movable luminous spots to appear on the ground, the speed of displacement thereof being variable.

For that purpose, use is made of a wire D rendered incandescent and of a mask E in which is provided a slot L in the shape of a spiral or the like. The rotation of the mask E allows luminous spots to appear at $P_1$, $P_2$, $P_3$, $P_4$, etc. which luminous spots radially move in translation at a speed which is function of the speed of rotation of the mask E.

What I claim as my invention and desire to secure by Letters Patent is:

1. In a sighting device adapted for aeronautics for vertical dive aerial bombardment and for the measurement of the speed of an airplane equipped with the said device, in combination: a gyroscope having a vertical axis, a mirror rigid with the rotor box of the said gyroscope, a luminous spot rigid with the airplane, an optical system also rigid with the airplane, interposed between the luminous spot and the mirror for directing the rays towards a point located at the center of inertia of the gyroscope, a first oblique transparent glass plate rigid with the airplane, the image of the luminous spot being reflected from the fixed mirror to the box of the gyroscope and in the form of parallel rays towards said first glass plate which in turn reflects them, and a second transparent glass plate rigid with the airplane and arranged parallel to the first glass plate for receiving the rays reflected by said first glass plate, said second glass plate reflecting in its turn said rays parallel to the direction to which they reach the first glass plate for forming an image of the luminous spot at infinity, the scond glass plate being placed relatively to the optical system and to the gyroscope so that the pilot can see, without any obstacle and independently of his position relatively to the said second glass plate, through the said second glass plate on the one hand, the scenery and on the other hand to infinity the image of the source of light which coincides with the target when the path followed by the airplane coincides with a definite direction such as the vertical passing through the target.

2. In a sighting device adapted for aeronautics for vertical dive aerial bombardment and for the measurement of the speed of an airplane equipped with the said device, in combination: a gyroscope having a vertical axis, a mirror rigid with the rotor box of the said gyroscope and having a curvature with its focus coinciding with the center of inertia about which the gyroscope rotates, a source of light rigid with the airplane, a lens rigid with the airplane and devised for causing the light rays emitted by the source of light to converge at the focus of the said mirror, the said lens constituting the optical system, a first oblique transparent glass plate rigid with the airplane and receiving the light rays reflected by the said mirror, and at least a second transparent glass plate rigid with the airplane and arranged parallel to the first glass plate for receiving the light rays reflected by the said first glass plate, the said second glass plate reflecting in its turn, the said light rays parallel to the direction in which they reach the first glass plate, the said second glass plate being placed relatively to the optical system and to the gyroscope so that the pilot can see, without any obstacle and independently of his position relatively to the said second glass plate, through the said second glass plate on the one hand the scenery and on the other hand to infinity the image of the source of light which coincides with the target when the path followed by the airplane coincides with a definite direction such as the vertical passing through the target.

3. In a sighting device adapted for aeronautics for vertical dive aerial bombardment and for the measurement of the speed of an airplane equipped with the said device, in combination a gyroscope having a vertical axis, a plane mirror rigid with the rotor box of the said gyroscope, a source of light rigid with the airplane, an optical system rigid with the airplane and comprising on the one hand a lens whose focus coincides with the source of light and which is designed so that the rays issuing from the said source of light issue parallel to the axis of the said lens and on the other hand, a plurality of lenses arranged so that the light rays which pass through the same issue as parallel rays for impinging against the said plane mirror, a first oblique transparent glass plate rigid with the airplane and receiving the rays reflected by the said mirror and at least a second transparent glass plate rigid with the airplane and arranged parallel to the first glass plate for receiving the rays reflected by the first glass plate, the second glass plate reflecting in its turn the said rays parallel to the direction in which they reach the first glass plate, the said second glass plate being placed relatively to the optical system and to the gyroscope so that the pilot can see without any obstacle and independently of his position relatively to the said second glass plate, through the second glass plate on the one hand the scenery and on the other hand to infinity the image of the source of light which coincides with the target when the path followed by the airplane coincides with a definite direction such as the vertical passing through the target.

4. In a sighting device as specified in claim 3, the series of lenses, which is arranged so that the light rays which pass through the same issue as parallel rays for impinging against the plane mirror, comprises a plurality of lenses, the focii of which coincide, and a light ray entering the first lens parallel to the axis issues from the last lens parallel to the axis, the whole formed by the series of lenses having a magnifying power of two or ½ according to the direction in which it is considered.

5. In a sighting device as specified in claim 3, the series of lenses which is arranged so that the light rays which pass through the same issue as parallel rays for impinging against the plane mirror, comprises a first convergent lens having a focal distance $2a$ and a second divergent lens having a focal distance $a$ and arranged at a focal distance $a$ from the center of the first convergent lens.

6. In a sighting device as specified in claim 3, the optical system being arranged so that its magnifying power is slightly greater or slightly smaller than 2 or ½ according to the direction in which it is considered.

7. In a sighting device adapted for aeronautics for vertical dive aerial bombardment and for the measurement of the speed of an airplane equipped with the said device, in combination: a gyroscope having a vertical axis, a plane mirror rigid with the rotor box of the said gyroscope, a source of light rigid with the airplane, a lens having a focal distance $2a$ constituting an optical system rigid with the airplane, interposed between the source of light and the mirror and adapted to direct the light rays emitted by the said source to the said mirror, the distance between the mirror and the lens being equal to $a$, a first oblique transparent silvered glass plate rigid with the airplane and receiving the rays reflected by the said mirror and at least a second transparent non-silvered glass plate rigid with the airplane and arranged parallel to the first glass plate for receiving the rays reflected by the said first glass plate, the said second glass reflecting in its turn the said rays parallel to the direction in which they reach the first glass plate, the said second glass plate being placed relatively to the optical system and to the gyroscope so that the pilot can see, without any obstacle and independently of his position relatively to the said second glass plate, through the said second glass plate on the one hand the scenery and on the other hand to infinity the image of the source of light which coincides with the target when the path followed by the airplane coincides with a definite direction such as the vertical passing through the target.

8. In a sighting device adapted for aeronautics for vertical dive aerial bombardment and for the measurement of the speed of an airplane with the said device, as specified in claim 7, the source of light being combined with a glass stick curved and tapered at one end and the said stick being surrounded by an opaque body except the end which forms a luminous spot applied against the lens.

9. In a device as specified in claim 7, the lens being provided with an annular groove and means provided for causing a luminous circle to appear in the said groove and to appear on the ground for allowing to measure the filing off time of an obstacle on the ground in the said luminous circle.

10. In a device as specified in claim 7, in combination a mask provided with a slot in the shape of a spiral, a radial wire rendered incandescent and means for rotating the said mask so as to cause luminous points to appear on the ground, which radially move in translation at a speed which is function of the speed of rotation of the mask.

CHARLES EDOUARD PIERRE GOURDOU.